B. WIDMER.
FLYTRAP.
APPLICATION FILED MAY 14, 1918.
1,319,369. Patented Oct. 21, 1919.
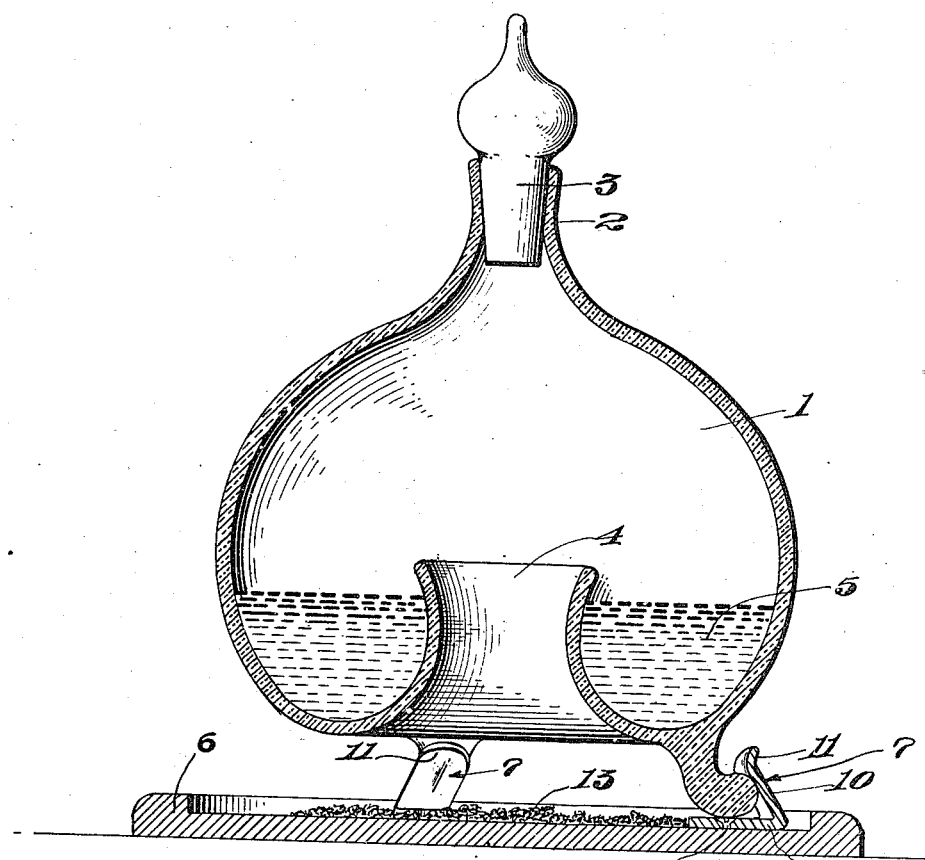
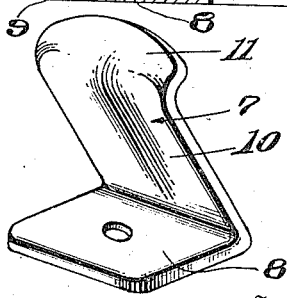
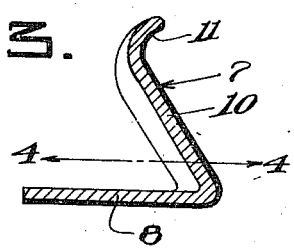
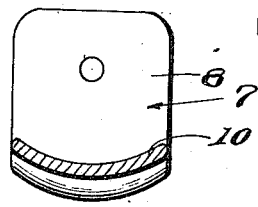
Inventor
Beda Widmer.
By Lancaster and Allwine,
his Attorneys.

UNITED STATES PATENT OFFICE.

BEDA WIDMER, OF LEEDS, MASSACHUSETTS.

FLYTRAP.

1,319,369.  Specification of Letters Patent.  Patented Oct. 21, 1919.

Application filed May 14, 1918. Serial No. 234,468.

*To all whom it may concern:*

Be it known that I, BEDA WIDMER, a citizen of the United States, and a resident of Leeds, in the county of Hampshire and State of Massachusetts, have invented certain new and useful Improvements in Flytraps, of which the following is a specification.

This invention relates to fly traps, and an object of the invention is to provide a fly trap, of artistic appearance comprising a body of glass or suitable material having an inwardly extending flange formed centrally in the bottom thereof and projecting upwardly therefrom which is provided with an opening that alines with the opening in the top of the body, to provide a supporting base carrying a plurality of resilient supporting legs having concaved surfaces for engagement with the legs of the trap to yieldably and removably support the body and permit rotation of the body independently of the base and further to provide a recess in the base for receiving bait for enticing flies to the trap.

Other objects of the invention will appear in the following detailed description, taken in connection with the accompanying drawing forming a part of this specification, and in which drawing:

Figure 1 is a vertical section through the improved trap.

Fig. 2 is a perspective view of one of the resilient body supporting legs of the trap.

Fig. 3 is a vertical section through one of the resilient supporting legs.

Fig. 4 is a horizontal section taken on the line 4—4 of Fig. 3.

Referring more particularly to the drawing, 1 designates the body of the improved trap which is constructed of glass, or other suitable translucent or transparent material and the body is gracefully curved to provide a neat appearing artistic body. The body 1 tapers inwardly at its top and center to form a neck 2 which is open, and normally closed by a stopper 3. The bottom of the body 1 curves upwardly into the interior of the body, providing a centrally disposed upstanding portion 4, the wall of which is concavo-convex having its convex surface positioned toward the vertical axis thereof as clearly shown in Fig. 1 of the drawing. The upstanding centrally disposed projection 4 is hollow and opens into the body to permit the entrance of flies or insects into the body through the opening in this member. A suitable insect destroyer or liquid insecticide is placed within the body 1 as shown at 5, so that when the flies or other insects enter the body, they will be killed.

A suitable supporting base 6 is positioned beneath the body 1 and it has a plurality of resilient legs 7 attached thereto. The legs 7 comprise base portions 8 which are pivotally connected to the upper surface of the base by suitable attaching means 9, and upstanding portions 10 which extend upwardly from the outer edges of the bases 8 of the leg structures. The upstanding leg portions 10 angle forwardly over the base 8 and are concavely curved having their upper portions flared outwardly as shown at 11 to snugly fit against the outer surface of the legs 12 of the body 1 near the bottom of the same. The leg structures 7 have sufficient resiliency to frictionally bind against the legs 12 and connect this body to the base 6 to allow rotary movement of the body 1 independently of the base when the gripping legs are swung about on their pivots, as well as permitting the removal of the body from the base for the purpose of cleaning the body and emptying the insecticide and destroyed insects therefrom.

The base 6 is provided with an annular upstanding portion 12 formed about its outer edge which confines the bait indicated at 13 upon the upper surface of the bait directly beneath the entrance to the opening of the upwardly extending centrally disposed portion 4.

In use, the stopper 3 is placed in the mouth or neck of the body 1 and the same is inverted after which the insecticide is poured within the body through the opening in the projection 4 and the body is reversed to its normal position and placed so that its legs 12 will be in engagement with the supporting or gripping legs 7 which hold the body spaced vertically from the upper surface of the base 6 sufficiently to permit flies or other insects to pass between the body 1 and the base 6 to reach the bait 13 which has previously been upon the upper surface of the base. The insects, after leaving the bait 13 will naturally fly upwardly through the opening in the projection 4 and enter the body 1, where they will be destroyed by the insecticide.

Having fully described the invention, what is claimed is:

In an insect trap, the combination, of a body having legs formed thereon, a base, a plurality of resilient supporting legs pivotally carried by said base for movement about a vertical axis and comprising flat base engaging portions and upstanding leg portions, said resilient upstanding leg portions angling inwardly over said flat base engaging portions and concavely curved to frictionally engage the body legs and having their upper ends flared outwardly to guide the body legs into the concaved angled portions of the resilient legs.

BEDA WIDMER.